(12) United States Patent
Brannock, Jr.

(10) Patent No.: US 10,953,971 B1
(45) Date of Patent: Mar. 23, 2021

(54) ADJUSTABLE HALYARD TENSIONER

(71) Applicant: James B. Brannock, Jr., Burlington, NC (US)

(72) Inventor: James B. Brannock, Jr., Burlington, NC (US)

(*) Notice: Subject to any disclaimer, the term of this patent is extended or adjusted under 35 U.S.C. 154(b) by 139 days.

(21) Appl. No.: 16/452,033

(22) Filed: Jun. 25, 2019

(51) Int. Cl.
*B63H 9/10* (2006.01)
*A01K 91/08* (2006.01)
*F16F 1/46* (2006.01)
*F16F 1/362* (2006.01)
*B63B 21/20* (2006.01)
*B63B 21/08* (2006.01)

(52) U.S. Cl.
CPC ............... *B63H 9/10* (2013.01); *A01K 91/08* (2013.01); *B63B 21/08* (2013.01); *B63B 21/20* (2013.01); *F16F 1/362* (2013.01); *F16F 1/46* (2013.01); *F16F 2224/02* (2013.01); *F16F 2224/0208* (2013.01); *F16F 2230/0005* (2013.01); *F16F 2236/06* (2013.01)

(58) Field of Classification Search
CPC ........... B63H 9/10; B63B 21/08; B63B 21/20; B63B 2021/203
See application file for complete search history.

(56) References Cited

U.S. PATENT DOCUMENTS

| | | | |
|---|---|---|---|
| 3,879,884 A | 4/1975 | Tucker, Sr. | |
| 4,099,750 A * | 7/1978 | McGrew | D07B 1/185 114/221 R |
| 4,258,608 A * | 3/1981 | Brown | D04C 1/12 114/215 |
| 5,417,008 A | 5/1995 | Smith | |
| 5,454,184 A | 10/1995 | Pirkle | |
| 5,699,657 A * | 12/1997 | Paulson | B65H 69/06 28/142 |
| 6,129,033 A | 10/2000 | Jarrell | |
| 7,032,529 B2 * | 4/2006 | Sanford | B63B 21/00 114/230.2 |
| 7,703,372 B1 | 4/2010 | Shakespeare | |
| 8,096,025 B2 * | 1/2012 | Dugger | B63B 21/08 24/298 |
| 8,950,350 B2 * | 2/2015 | Merrill | B63B 21/20 114/230.24 |
| 9,003,757 B2 | 4/2015 | Mozsgai et al. | |
| 9,173,386 B2 | 11/2015 | Karpanty | |

(Continued)

*Primary Examiner* — Andrew Polay
(74) *Attorney, Agent, or Firm* — Tuggle Duggins P.A.; Blake P. Hurt

(57) ABSTRACT

An adjustable tensioner particularly suited for use in applying tension to a halyard line circuit on an outrigger is disclosed and features a length of hollow braided rope having a proximate end serving as a first anchor point for attachment to a boat gunwale; a distal end; a loop section positioned intermediate the proximate end and the distal end, and a braid-in-braid section positioned intermediate the loop section and the proximate end; the loop section serving as a second anchor point for attachment to the halyard line circuit; wherein the effective distance between the first and second anchor points is adjusted by reducing or enlarging the size of the loop section; and wherein when tension is applied to the first and second anchor points, the braid-in-braid section provides a self-induced friction amplification effect to prevent an increase in the distance between the first and second anchor points.

19 Claims, 4 Drawing Sheets

(56) References Cited

U.S. PATENT DOCUMENTS

| | | |
|---|---|---|
| 9,550,549 B1 * | 1/2017 | Ratigan .................. B63B 21/20 |
| 9,988,748 B2 * | 6/2018 | Prouvost .................. D04B 1/06 |
| 10,227,109 B2 * | 3/2019 | Mullikin ................ B63B 21/20 |
| 10,640,920 B2 * | 5/2020 | Worswick ................ D07B 1/18 |

\* cited by examiner

ADJUSTABLE HALYARD TENSIONER

FIELD OF THE INVENTION

The invention relates generally to accessories for use with outriggers on fishing boats; and more specifically relates to devices used for adjusting and maintaining tension on halyard line circuits on an outrigger.

DESCRIPTION OF THE PRIOR ART AND OBJECTIVES OF THE INVENTION

Sport fishermen are constantly seeking ways to improve their catch on outings. One common apparatus used by sport fisherman to improve their ability to catch fish are outriggers. An outrigger is a pole, generally made from telescoping sections, that is attached to a support standard on the boat deck or to an overhead cover on a sport fishing boat. The outrigger allows multiple fishing lines to be spread out to the sides of the boat, which in turn enables multiple fishing lines to be deployed while minimizing the risk of the lines becoming entangled. Having more fishing lines and bait in the water increases the chances of catching a fish.

An outrigger functions as a support to secure fishing lines at a distance from the sides of the boat, while the fishing pole remains in place on the boat deck. The fishing lines are held in place on the outrigger by line release clips that release when a fish strikes the bait, thus allowing for the fisherman to bring in the fish from a safe location on the boat deck. See, for example, U.S. Pat. No. 5,454,184, the disclosure of which is incorporated in its entirety herein. One or more heavy lines, referred to as a halyard line circuit, are attached to the outrigger by rings or pulleys and used to spread the fishing lines at desired locations along the length of the outrigger, similar to the way a string or rope is used to raise and lower flags on a flagpole.

For proper functioning, it is important to maintain tension on the lines used in the halyard line circuit, but also permit the lines to move somewhat to account for the variable drag and tension on the fishing lines while they are in the water on a moving boat. A common method of maintaining tension on the halyard circuit is to employ a shock cord—a stretchable cord typically made of rubber or other elastomeric material—attached at one end to the halyard line and at the other end to the boat gunwale. The elastomeric nature of the shock cord allows it to elongate and retract with movement of the halyard lines.

There are disadvantages associated with the use of shock cords. Shock cords, when under tension, can cause severe injury if they were to break or come loose from their anchor points. Thus, they present a safety hazard. Another disadvantage is that most of the shock cords available are made from a black elastomeric material. This material leaves unsightly black marks on the gunwale of the boat which are difficult to remove. Further, when a halyard line circuit is initially installed, the halyard lines are installed taught. The stress and load on the fishing lines and halyard lines causes the shock chords to permanently elongate after use (i.e. increasing the modulus of elasticity), creating slack in the lines. The line release clips on the outrigger will not release properly if there is slack in the halyard lines, so failure to maintain tension on the lines can result in a lost catch. Thus, when using shock cords, it is necessary to perform maintenance to readjust and re-tension the halyard lines.

Shock cords are generally available in a limited number of fixed lengths. Because the shock cord is of a fixed, non-adjustable length, the only way to remove the slack that develops in the halyard line circuit is to cut and reattach the halyard lines. This can be a time consuming and cumbersome process because halyard lines are often attached by crimping a ferrule, which requires special tools. It can also present an interruption in the use of the outrigger or a personal safety issue if the fisherman attempts to perform the re-rigging procedure while the outrigger is deployed, rather than from the safety of the boat deck.

In order to avoid this process, fishermen have been known to remove the shock cord from the gunwale and tie a knot in it to effectively shorten its length, and then re-attach it to the gunwale. Unfortunately, tying a knot in the shock cord eliminates the flexibility needed to allow the halyard lines their necessary movement in use. In addition, tying knots in the elastomeric cord creates stress points and weakens the elastic and creates a safety concern, particularly in a nautical environment, often in the presence of salt water.

Another known method of maintaining tension on the halyard line circuit is to use a cam lock device like those sold by Taco Marine and Rupp Marine. These cam lock devices feature a bracket containing a pair of cam locks and a vertically oriented bolt with a through-hole. The bracket is affixed to the underside of the gunwale by the bolt. A thin rope is attached to the halyard line circuit and inserted into the through-hole in the bolt, then passed between the cams. Pulling the rope will remove the slack from the halyard line circuits and the cams will keep the rope in place. This is a very similar concept to the use of cam locks to secure sail halyards and anchor ropes that has been in use for many years. While these devices function and offer the ability to adjust the tension on the halyard lines quickly, they are very expensive, particularly for the recreational fisherman. The cam locks are also inconvenient to install and require drilling holes through the boat gunwale for installation and further require waterproofing measures to prevent water intrusion into the interior of the hull of the boat.

In view of the problems and disadvantages associated with prior art devices there is a need for a simple, inexpensive and effective solution to permit rapid and routine adjustment to the tension on halyard lines of an outrigger. Thus, the present invention was conceived and one of its objectives is to provide a simple, reliable, safe and inexpensive halyard line tensioner.

It is another objective of the present invention to provide a halyard line tensioner that can readily be adjusted to increase or decrease the tension in the outrigger halyard lines.

It is still another objective of the present invention to provide an adjustable halyard line tensioner that can be readily employed without costly, cumbersome, permanent or intrusive modifications to the gunwale.

It is a further objective of the present invention to provide an adjustable halyard line tensioner that is comparatively non-elastomeric (i.e. defines a consistent modulus of elongation over time that is lower than a rubber shock chord in a statistically significant degree), leaves no unsightly scuff marks on the boat and is far safer to use under tension than the current shock cords.

It is yet a further objective of the present invention is to provide a halyard line tensioner that utilizes a self-induced friction amplification effect.

Various other objectives and advantages of the present invention will become apparent to those skilled in the art as a more detailed description is set forth below.

SUMMARY OF THE INVENTION

In preferred embodiments, a tensioner for an outrigger halyard line includes a length of hollow braided rope having a ring or eyelet fixedly secured to a proximate end of the rope. Adjacent to the proximate end of the rope is an eye splice. A second ring or eyelet is attached to the rope for movement along the length of the rope as the loop of the eye splice is enlarged or reduced. By reducing or enlarging the size of the loop in the eye splice, the effective length between to rings or eyelets is correspondingly reduced or enlarged. The eye splice creates a braid-in-braid section of the rope located between the loop section and the proximate end of the rope. As tension is applied to the rings or eyelets, the braids tighten and lock in place, preventing further elongation of the rope. As the tension is increased, the braids tighten even further as a result of the self-induced friction amplification effect.

DETAILED DESCRIPTION OF THE PREFERRED EMBODIMENT AND OPERATION OF THE INVENTION

Figure 1:
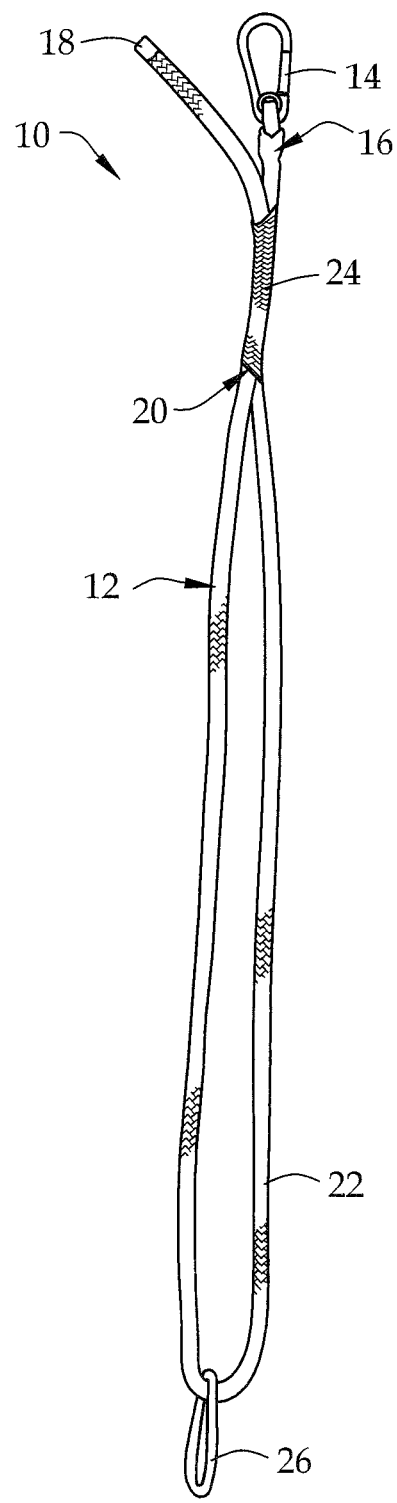
FIG. 1 is a perspective view of a preferred embodiment of the halyard line tensioner of the invention, showing the tensioner in an extended length condition.

Various exemplary embodiments of the present disclosure are described below. Use of the term "exemplary" means illustrative or buy way of example only, and any reference herein to "the invention" is not intended to restrict or limit the invention to exact features or step of any one or more of the exemplary embodiments disclosed in the present specification. References to "exemplary embodiment", "one embodiment", "an embodiment", "various embodiments", and the like may indicate that the embodiment(s) of the invention so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The present invention is described more fully hereinafter with reference to the accompanying figures, in which one or more exemplary embodiments of the invention are shown. Like numbers used herein refer to like elements throughout. The invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the invention, and any and all equivalents thereof. Moreover, many embodiments such as adaptations, variations, modifications, and equivalent arrangements will be implicitly disclosed by the embodiments described herein and fall within the scope of the instant invention.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has previously been reduced to practice or that any testing has been performed. Likewise, unless stated otherwise, use of verbs in the past tense (present perfect or preterit) is not intended to indicate or imply that the invention has previously been reduced to practice or that any testing has been performed.

Figure 2:
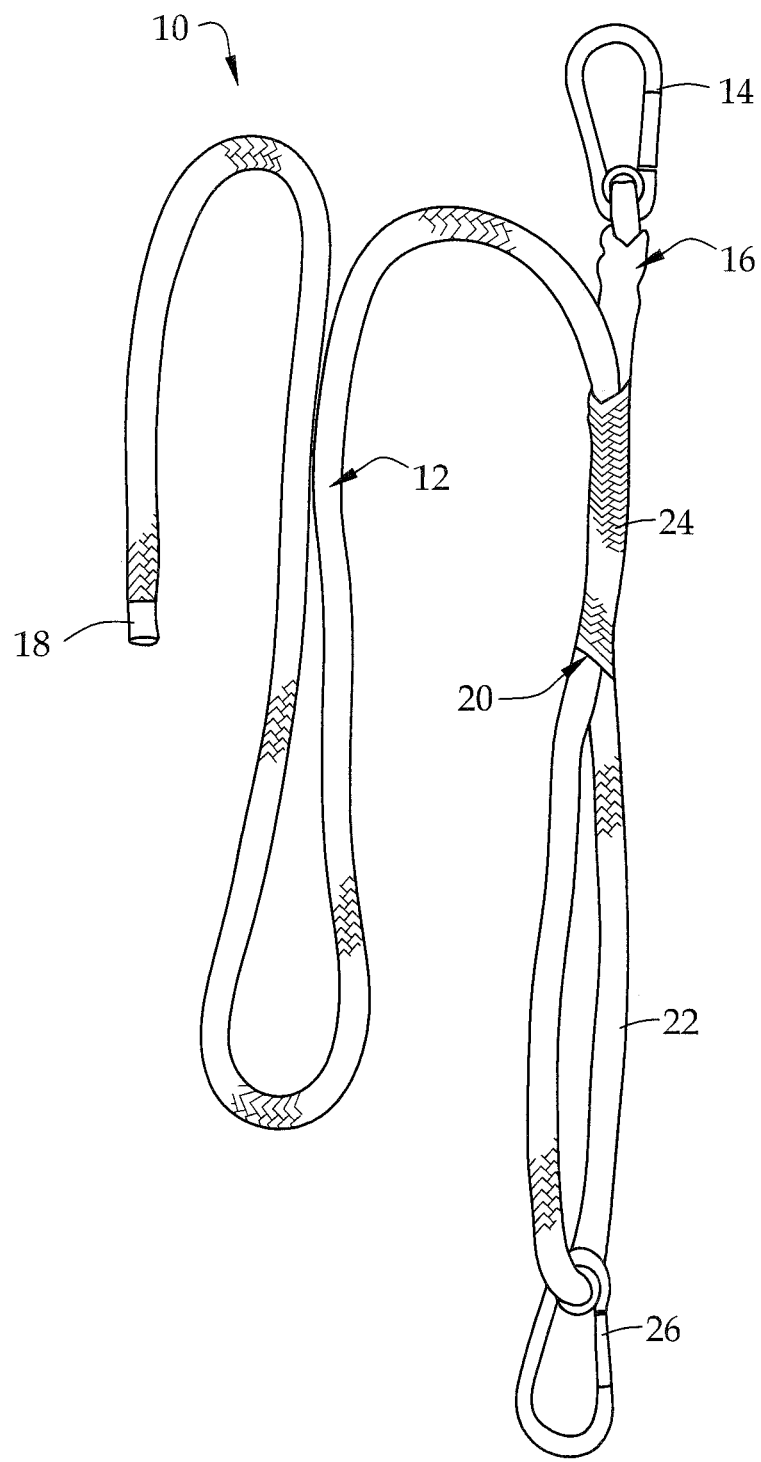
FIG. 2 is a perspective view of the tensioner of FIG. 1, shown in a reduced length condition.
Figure 3:
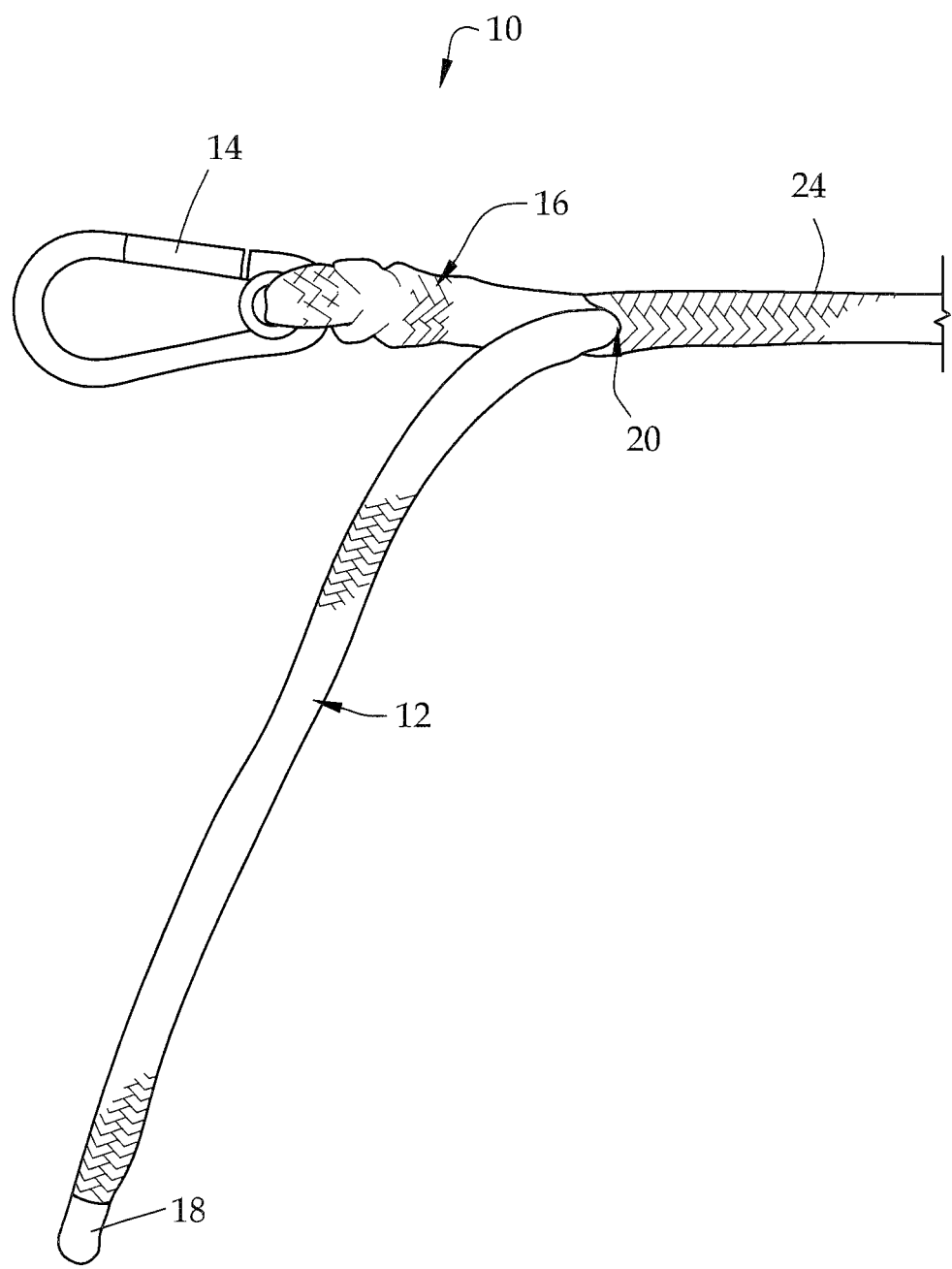
FIG. 3 is a perspective view of the tensioner of FIG. 1, particularly illustrating the proximate end of the tensioner.

Referring to FIGS. 1-3, the preferred embodiment of the adjustable halyard line tensioner of this invention is of elegantly simple construction. The tensioner 10 may comprise a length of braided rope 12. The rope 12 is preferably the outer sheath of a length of polyester double braided rope. These ropes offer moderate stretch, easy handling, high tensile strength and are flexible, colorfast, fade resistant and UV resistant. The outer sheath can be accessed by removing the core of the double braided rope.

In the embodiment shown, a stainless steel snap lock carabiner 14 with ring eyelet is affixed to one end, referred to as the proximate end 16, of the rope 12. The proximate end 16 of the rope 12 is the part of the tensioner that is attached to the boat gunwale (not shown) during use. In other embodiments, the snap lock carabiner can be replaced with a simple ring or eyelet and a separate carabiner, snap lock pin, swivel hook, or other suitable fastener could be used to secure the ring or eyelet to the gunwale.

As best seen at least in FIG. 3, the snap lock carabiner 16 is fixedly attached to the proximate end 16 of the rope 12. This attachment can be by any suitable method, such as by use of a crimp sleeve, etc. In the preferred embodiment shown in FIG. 3, the carabiner 16 is affixed by an eye splice that is lock stitched to keep the splice from separating or failing under pressure. An eye splice is a method of forming a permanent loop (called an "eye") in the end of a rope. Eye splices have been known and used for many years.

Rope 12 defines a distal end 18, which may be considered a free end of the rope or it may be doubled over/around and closed. Intermediate the proximal end 16 and the distal end 18, and in close proximity to the proximal end 16, is an eye splice 20. The eye splice 20 creates a loop section 22 and a braid-in-braid section 24 in the rope 12. The term "braid-in-braid" as used herein refers to one section of the hollow braided rope 12 being passed through another section of the hollow braided rope to form an area where the two braided sheaths form concentric layers. The braid-in-braid section 24 may be any suitable length, depending on the desired length of the tensioner 10.

The loop section 22 of the rope 12 is provided with a ring or eyelet, which in preferred embodiments is a stainless steel snap lock carabiner with ring eyelet 26. As mentioned above with regard to carabiner 14, carabiner 26 may also be a ring or eyelet, preferably stainless steel, to which another fastener may be attached. When the tensioner is in use, the carabiner 26 will be connected to an attachment point on the halyard line circuit, such as a pulley or a lock block such as that taught in U.S. Pat. No. 9,173,386 (the disclosure of which is incorporated herein by reference in its entirety). Those skilled in the art will recognize that it is a possibility to eliminate the ring or eyelets and use a carabiner, snap lock, or other fastener to attach directly to the rope, and therefore this alternative embodiments are considered within the scope of the instant disclosure. However, such embodiments are not preferred because it can cause unnecessary abrasion and weakening of the rope fibers.

With particular reference to FIGS. 1 and 2, the length of the loop section 22 can be easily adjusted by pulling the distal end 18 or the loop section 22 through the eye splice 20. By enlarging or reducing the size of the loop section, the effective length between the two carabiners 14, 26 is also increased or decreased. In use, the carabiners 14, 26 define the attachment points or anchor points between the halyard line circuits and a fixed point on the boat. Accordingly, by adjusting the length between these two attachment points, the tension on the halyard line is also adjusted. A loop, ring or other device may be added or formed in the distal end 18 of the rope to provide a hold to facilitate shortening the length between the two carabiners. For example, the distal end 18 of the rope 12 may be passed through a hole in a ball (such as a rubber or plastic ball) and then knotted, or a loop may be formed by adding another eye splice to the distal end to facilitate gripping and pulling the distal end of the rope 12. However, in the preferred embodiment, distal end 18 is not open or free as described above, but rather is shaped into a loop and formed with a lock stitched eyelet.

As mentioned previously, when tension is applied to the carabiners 14, 26, the braid-in-braid section 24 constricts and the frictional forces between the inner braid and the outer braid prevents them from moving relative to one another and fixes the distance between the carabiners. The more tension applied to the carabiners, the tighter the constriction. The phenomenon involved is known as self-induced friction amplification. The same phenomenon is involved in the novelty item known as the "Chinese Finger Trap" (also called the Chinese finger puzzle, Chinese thumb cuffs, or Chinese handcuffs) and is also employed in devices used to pull cable through a tube or tunnel (known commercially as pulls grips, cable pullers, towing socks or wire rope pullers) and in devices (called cord strain reliefs) used to prevent cable pullout at the point of termination. In each of these devices, applying tension to the braids causes a reduction in diameter of the sheath. The frictional forces caused by the braids can be significant and is directly related to the amount of tension applied—the higher the tension, the greater the reduction in diameter and the greater the gripping force. Releasing the tension in the braids causes them to relax and the sheath returns to its original diameter, thus allowing for adjustment of the loop section 22.

An exemplary embodiment of the tensioner of this invention can be made by the following steps:

Step One: Obtain a length of double braided polyester rope of appropriate length and diameter. For most applications on a recreational sport fishing boat with telescopic outriggers, a length of approximately three feet (3') of three-eighths inch (⅜") diameter rope is sufficient. Remove the core of the rope to leave only the outer sheath.

Step Two: Create an eye splice in one end (proximate end) of the rope and attach a stainless steel carabiner with eyelet. Lock stitch the eye splice.

Step Three: Create an eye splice in the rope approximately three to four inches (3-4") away from the first eye splice, creating a braid-in braid section in the rope of approximately five to six inches (5-6") in length. Thread a stainless steel carabiner with eyelet on the rope before completing the loop on the eye splice.

Step Four (optional): Form a loop or attach a finger ring, ball or other device to improve grip on the distal end (free or closed) of the rope.

Figure 4:
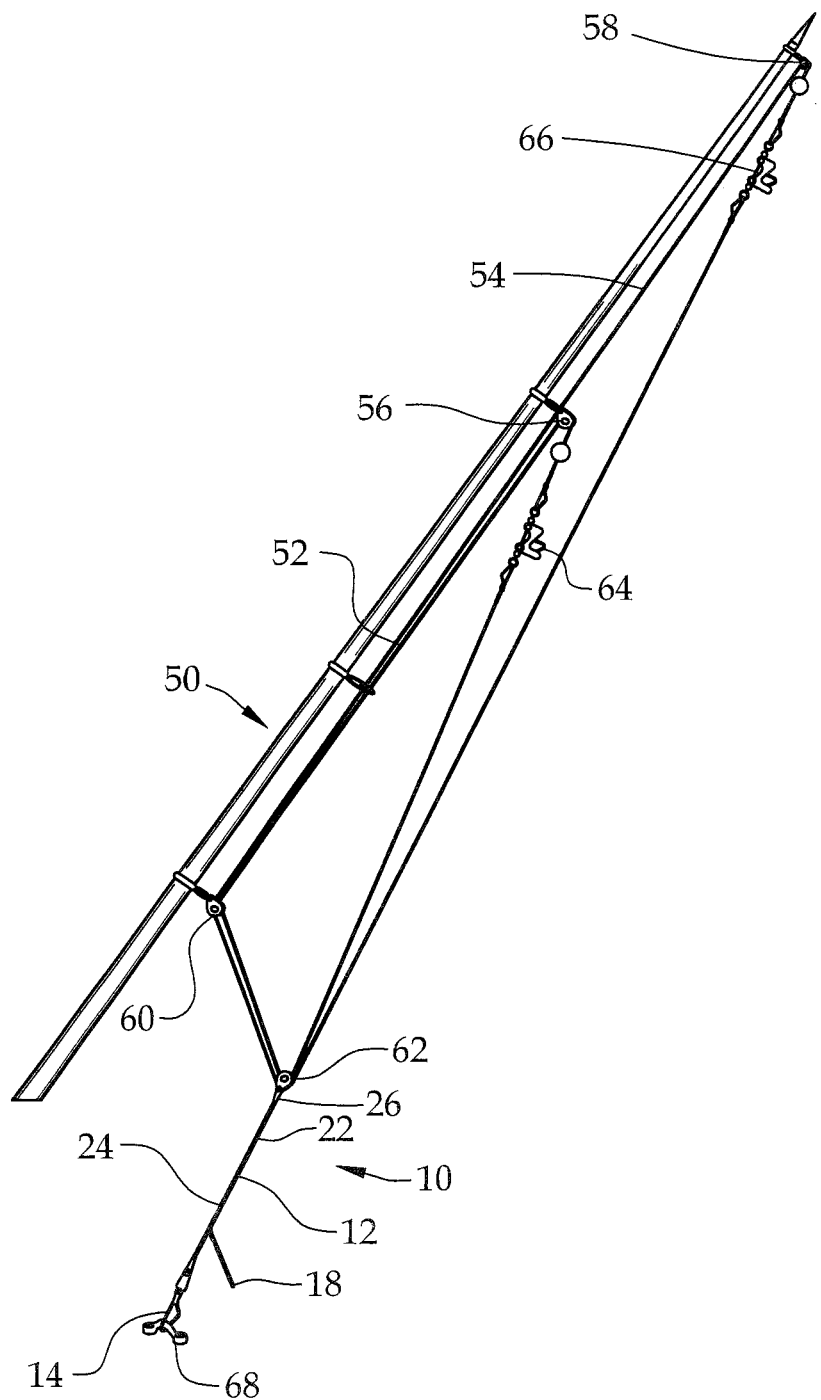
FIG. 4 is a schematic illustration of a standard double halyard line circuit showing the tensioner of the invention in use.

With reference now made to FIG. 4, a standard double halyard line circuit is shown. The set-up shown in FIG. 4 comprises a telescopic outrigger 50, a short rigged halyard line 52, and a long rigged halyard line 54. Each of lines 52, 54 are attached to the outrigger 50 by respective single line pulleys 56, 58 and double pulleys 60, 62. Each of the lines 52, 54 also includes a respective line release clip 64, 66. The tensioner 10 connects the halyard line circuit to the boat. In the set-up illustrated in FIG. 4, carabiner 14 is attached to a suitable bracket or anchor hold, such as saddle 68, attached to the gunwale (not shown). This serves as a point to anchor tensioner 10 to the boat. Carabiner 26 is attached to double pulley 62 and serves as a point to anchor tensioner 10 to the halyard line circuit. The distal end 18 of rope 12 is then pulled to place the desired amount of tension on the halyard line circuit. The tension is maintained by virtue of the self-induced friction amplification effect mentioned above. If slack develops in the halyard lines, such as might be caused by the stretching deformation in the lines, the distal end 18 of rope 12 is pulled to increase the tension to the desired amount. To remove the tension on the halyard lines, tension is removed from the braid-in-braid section of the rope 22 whereby the loop section 22 of rope 12 can be enlarged to increase the distance between carabiner 26 and carabiner 14.

While the intended use of the tensioner device disclosed herein is for halyard lines on outriggers of fishing boats, the tensioner may be used in numerous other applications. In addition, various substitutions or modifications to the embodiments illustrated and described may suggest themselves to those skilled in the art upon reading this disclosure. Accordingly, the illustrations and examples provided herein are for explanatory purposes and are not intended to limit the scope of the appended claims.

I claim:

1. A tensioner comprising a length of rope having a proximate end and comprising a first anchor point; a distal end; a loop section positioned intermediate the proximate end and the distal end, and a braid-in-braid section positioned intermediate the loop section and the proximate end; said loop section comprising a second anchor point; wherein an effective distance between the first and second anchor points is adjusted by increasing or decreasing the size of the loop section; and wherein when tension is applied to the first and second anchor points, said braid-in-braid section provides a self-induced friction amplification effect to prevent an increase in the distance between the first and second anchor points.

2. The tensioner of claim 1, wherein the proximate end comprises a lock stitched eye splice.

3. The tensioner of claim 1, wherein the first anchor point is defined by a stainless steel carabiner with an eyelet affixed to the rope by a lock stitched eye splice.

4. The tensioner of claim 1, wherein the length of rope comprises a double braided polyester rope with a core removed.

5. The tensioner of claim 1, wherein the second anchor point is defined by a stainless steel carabiner with an eyelet on the loop section of the rope.

6. The tensioner of claim 1, wherein the length of rope comprises a double braided polyester rope with a core removed and wherein the loop section comprises an eye splice.

7. The tensioner of claim 1, wherein the length of rope comprises the sheath of a double braided polyester rope with a core removed and wherein the braid-in-braid section defines two concentric layers of the sheath.

8. The tensioner of claim 1, wherein the length of rope comprises the sheath of a double braided polyester rope with a core removed; wherein the braid-in-braid section defines two concentric layers of the sheath; and wherein when tension is applied to the first and second anchor points, the braid-in-braid section constricts in diameter.

9. The tensioner of claim 1, wherein the loop section is reduced in size by pulling on the distal end of the rope.

10. The tensioner of claim 1, wherein the rope defines a lower modulus of elongation relative to an elastomeric shock cord.

11. The tensioner of claim 1, wherein the first anchor point comprises a stainless steel carabiner with an eyelet affixed to the rope by a lock stitched eye splice and wherein the second anchor point comprises a stainless steel carabiner with an eyelet on the loop section of the rope.

12. The tensioner of claim 1, wherein the first anchor point comprises a stainless steel carabiner with an eyelet affixed to the rope by a lock stitched eye splice and wherein the second anchor point comprises a stainless steel carabiner with an eyelet on the loop section of the rope; wherein the length of rope comprises a double braided polyester rope with a core removed and wherein the loop section comprises an eye splice.

13. The tensioner of claim 1, wherein the first anchor point comprises a stainless steel carabiner with an eyelet affixed to the rope by a lock stitched eye splice and wherein the second anchor point comprises a stainless steel carabiner with an eyelet on the loop section of the rope; wherein the length of rope comprises a double braided polyester rope with a core removed and wherein the loop section comprises an eye splice and wherein the braid-in-braid section defines two concentric layers of the sheath.

14. The tensioner of claim 1, wherein the first anchor point comprises stainless steel carabiner with an eyelet affixed to the rope by a lock stitched eye splice and wherein the second anchor point comprises a stainless steel carabiner with an eyelet on the loop section of the rope; wherein the length of rope comprises a double braided polyester rope with a core removed and wherein the loop section comprises an eye splice and wherein the braid-in-braid section defines two concentric layers of the sheath; wherein when tension is applied to the first and second anchor points, the braid-in-braid section constricts in diameter; and wherein the rope defines a lower modulus of elongation relative to an elastomeric shock cord.

15. The tensioner of claim 1 in combination with an outrigger having at least one halyard line circuit.

16. The tensioner of claim 1 in combination with an outrigger having at least one halyard line circuit, wherein the first anchor point is affixed to a boat gunwale and wherein said second anchor point is attached to the at least one halyard line circuit.

17. The tensioner of claim 1 in combination with an outrigger having at least one halyard line circuit, wherein the first anchor point is affixed to a boat gunwale; wherein said at least one halyard line circuit comprises a pulley and wherein said second anchor point is attached to the pulley on the at least one halyard line circuit.

18. The tensioner of claim 1 in combination with an outrigger having at two halyard line circuits and a double pulley; wherein the first anchor point is affixed to a boat gunwale; and wherein said second anchor point is attached to the double pulley.

19. The tensioner of claim 1 in combination with an outrigger having at least one halyard line circuit, wherein the first anchor point comprises a stainless steel carabiner with an eyelet affixed to the rope by a lock stitched eye splice, said first anchor point being affixed to a boat gunwale; wherein the second anchor point comprises a stainless steel carabiner with an eyelet on the loop section of the rope, said second anchor point being affixed to said at least one halyard line circuit; wherein the length of rope comprises a double braided polyester rope with a core removed; wherein the loop section comprises an eye splice and wherein the braid-in-braid section defines two concentric layers of the sheath; wherein when tension is applied to the first and second anchor points, the braid-in-braid section constricts in diameter; and wherein the rope defines a lower modulus of elongation relative to an elastomeric shock cord.

* * * * *